J. C. CLEMENT.
Potato-Planter.
No 51,560. Patented Dec. 19, 1865.
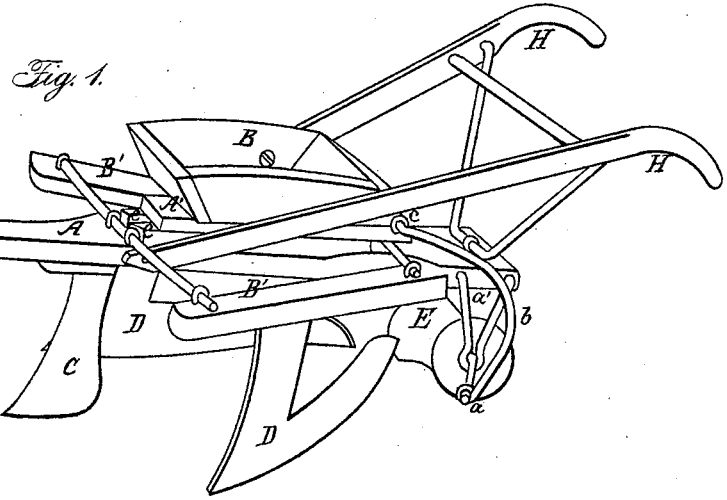
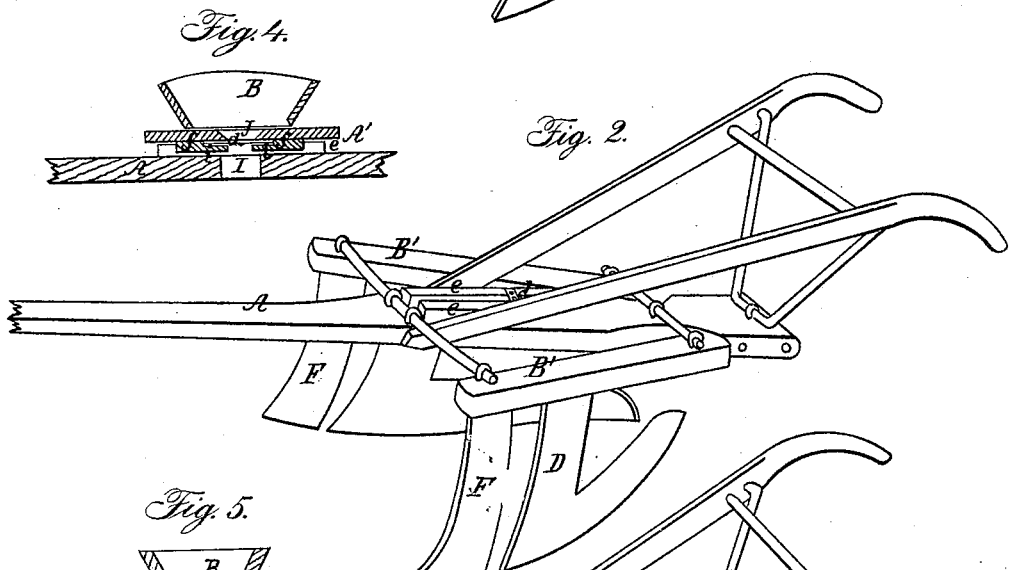
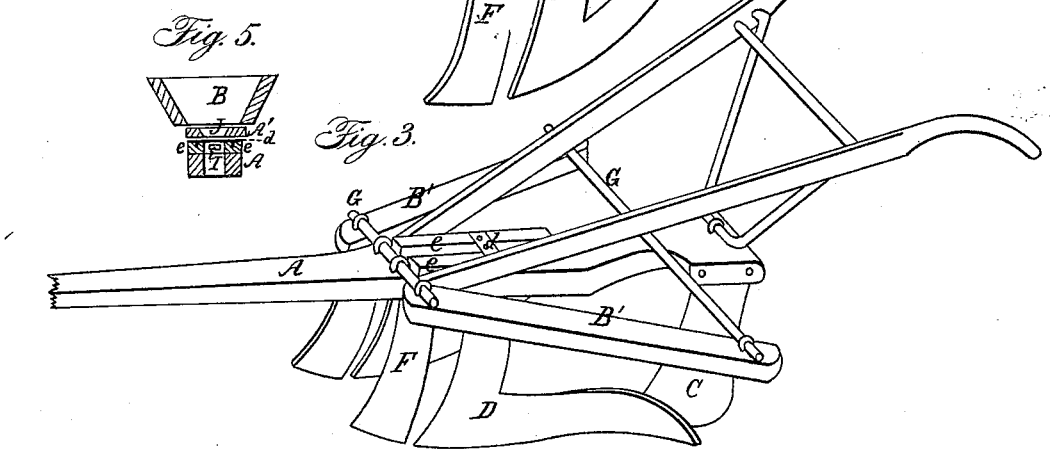
Witnesses:
J. W. Porter
A. L. Simpson
Inventor:
John C. Clement

United States Patent Office.

JOHN C. CLEMENT, OF KENDUSKEAG, MAINE.

IMPROVEMENT IN COMBINED MACHINE FOR PLANTING, HOEING, AND DIGGING POTATOES.

Specification forming part of Letters Patent No. 51,560, dated December 19, 1865.

*To all whom it may concern:*

Be it known that I, JOHN C. CLEMENT, of Kenduskeag, in the county of Penobscot and State of Maine, have invented a new and useful Machine for Planting, Hoeing, and Digging Potatoes; and I do hereby declare that the following is a full, clear, and exact description of the construction and operation of the same, reference being had to the annexed drawings, making a part of this specification, in which—

Figure 1 is a perspective view of the machine when used for planting. Fig. 2 is a perspective view when used for hoeing. Fig. 3 is a perspective view when used for digging. Fig. 4 is a longitudinal vertical section of the cutter and seeder, and Fig. 5 is a transverse section of the same.

Similar letters of reference indicate corresponding parts in the several figures.

The nature of my invention consists in a machine so constructed, that by slight changes, which are readily effected, it may be employed in seed-time to perform at once the operations of forming the furrow or drill, cutting the potatoes to the requisite size, dropping the same in the drill, covering them, and lastly smoothly rolling the earth over the drill. In the season of hoeing it forms, by removing the colter or drill-former and roller, and adding the auxiliary shares or wings, an effective horse-hoe; and in harvest time, by applying the colter at the rear of the machine, and reversing the shares or wings, it is equally effective for digging the crop.

To enable others skilled in the art to make and use my invention, I will proceed to describe its construction and operation.

A represents the "pole" and the "backbone" of the machine, which is of one piece.

B is the hopper, in which the potatoes are placed preparatory to being cut and dropped by the machine.

C is the colter which forms the furrow or drill into which the seed is dropped. This colter is formed upon the principle of the double mold-board, each wing diverging equally from the front edge.

D D are the shares or wings which cover the potatoes in planting, convey the earth to the plants in hoeing, and remove it in digging.

These shares are attached to and held in place by the side beams, B' B', which are held in position by rods G G, which latter are placed transversely to pole A, and secured to it in any suitable manner.

E is the roller which passes along over the drill, equalizing and properly compressing the earth deposited by the shares. This roller is fixed upon crank-shaft $a$, which is held by and revolves in bracket $a'$. This roller may be rendered adjustable in point of height by any ordinary means, if desired.

The curved rod $b$ connects crank-shaft $a$ with feeding-board A', at $c$, thereby imparting to said board a sliding motion for the purposes hereinafter shown.

The machine is held and governed by handles H, which are fastened to backbone A.

The feed-board A' forms the bottom of hopper B. Through this board is a vertical aperture J, Figs. 4 and 5.

Upon the under side of feed-board A' are fixed brackets $f f$, formed with fingers $i$. These brackets are placed upon the longitudinal center of the feed-board A', and slide between guides $e\,e$, upon which is secured, transversely to them, the cutting-blade $d$.

The operation of planting is as follows: The machine being started the friction of the earth upon roller E causes it to revolve, thereby, through the agency of crank $a$ and rod $b$, producing a sliding movement forward and back in feed-board A'. As this board passes forward so as to bring the aperture J forward of cutting-blade $d$, a potato falls into the space between guides $e\,e$, forward of blade $d$, and resting upon pole A. When the feed-board returns the forward finger, $i$, forces the potato past blade $d$, which separates it into two parts. That which is below the blade being forced along until it reaches aperture I in pole A falls into the drill formed by colter C, while the feed-board completes the movement to the rear, when the same process is repeated by the forward movement. As the machine passes on the shares D sweep the earth in over the drill, covering the seed, and the roller completes the operation of planting by leveling, equalizing, and smoothing the earth left over the furrow.

The distance between the pieces of seed in the furrow is easily regulated by the size of roller E, while the size of the pieces of seed is as easily regulated by the amount of space between pole A and blade d.

For the purpose of changing the machine to a horse-hoe, it is only necessary to remove roller E, colter C, and hopper B, at choice, and attach feet F to side beams B', when the machine is ready to cultivate the crop (it before planted) by drawing it along astride the rows of plants. It is fully shown ready for use as a horse-hoe in Fig. 2.

When it is desired to use the machine as a digger the colter C is attached to the rear end of backbone A, as shown in Fig. 3, and side beams, B', with the shares and feet remaining attached, are inverted, the one on the right being placed on the left side of the machine, and vice versa, the rods G being also changed, the longer occupying the rear and the shorter the front position, so that the shares converge toward the front instead of rear, as when planting or hoeing. Thus, as the machine is drawn along astride the rows of tubers, the feet F and shares D sweep the earth from near the rows into the middle of the space between them, while the colter C, passing along midway in the row, completely unearths the potatoes ready to be gathered into baskets by the husbandman.

Among the merits of my invention I desire to state, first, its exceeding small cost, it being but little if any greater than that of a good plow or harrow, which will enable every husbandman of even limited means to avail himself of its benefits; second, its light, portable, and yet durable nature, not exceeding in weight a medium-sized plow or cultivator; third, its simplicity of construction, no complication of gear, and no intricate parts, all of it being within the scope of the constructive ability of the common mechanic; fourth, by combining feet F with shares D several advantages are gained, among which are these: When planting the feet can be removed, thus diminishing the weight; the shares being proportionally smaller, the feet also receive the brunt of all collisions with hidden rocks or roots, and if broken but slight loss ensues compared with the breaking of the whole share, and upon some soils these feet may be dispensed with when digging; besides when hoeing all the advantages of long shares are secured; and last, its perfection of execution, as has been fully tested the present year by actual use in the field, where it has demonstrated its adaptation to the several uses for which it was designed.

What I claim as my improvement, and desire to secure by Letters Patent, is—

The frame A B', hopper B, feed-board A', colter C, shares D, roller E, and blades F, when the several parts are so arranged and combined as to form at will a potato planter, cultivator, or digger, as herein specified.

JOHN C. CLEMENT.

Witnesses:
    T. W. PORTER,
    A. L. SIMPSON.